US005511688A

United States Patent [19]

Duncan et al.

[11] Patent Number: 5,511,688

[45] Date of Patent: Apr. 30, 1996

[54] VENDING MACHINE DISPENSING SYSTEM

[75] Inventors: David W. Duncan; Larry D. Lee, both of St. Louis, Mo.; Kenneth W. Oden, Charles Town, W. Va.

[73] Assignee: Coin Acceptors, Inc., St. Louis, Mo.

[21] Appl. No.: 323,363

[22] Filed: Oct. 14, 1994

[51] Int. Cl.$^{6}$ .................................................. B65G 59/00

[52] U.S. Cl. .................................................. 221/67; 221/241

[58] Field of Search .................................................. 221/241, 67, 299, 221/289, 277, 266, 194, 295, 301

[56] References Cited

U.S. PATENT DOCUMENTS 2,836,326 5/1958 Childers .................................. 221/67
4,940,161 7/1990 Hieb .................................. 221/67
4,986,615 1/1991 Hieb et al. .................................. 312/45
4,991,739 2/1991 Levasseur .................................. 221/114
4,991,740 2/1991 Levasseur .................................. 221/114

*Primary Examiner*—Kenneth Noland
*Attorney, Agent, or Firm*—Cohn, Powell & Hind

[57] ABSTRACT

This vending machine dispensing assembly (10) for dispensing containers of different diameter includes a storage compartment (1) having an exit passage defined by a turnstile member (20) on one side and an arcuate stop member (30) on the other side. The stop member (30) is disposed in adjustable relation from the fixed axis (22) of the turnstile member (20) to determine the diameter of the articles passing therebetween. The stop member (30) is adjustably mounted between the end walls (16, 18) of the compartment (1) on upper and lower rods (32, 34).

16 Claims, 3 Drawing Sheets

FIG. 1.
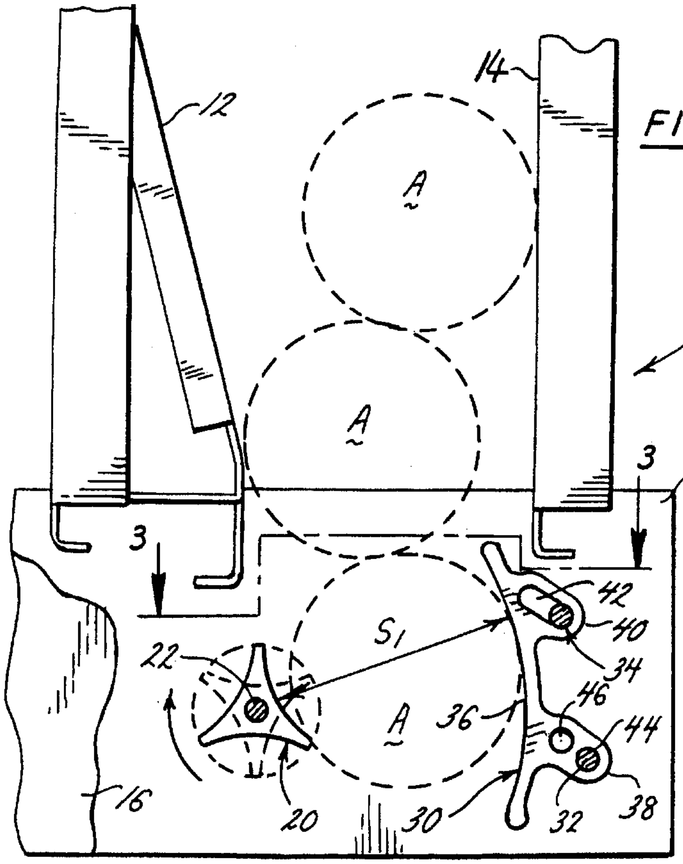
FIG. 6.
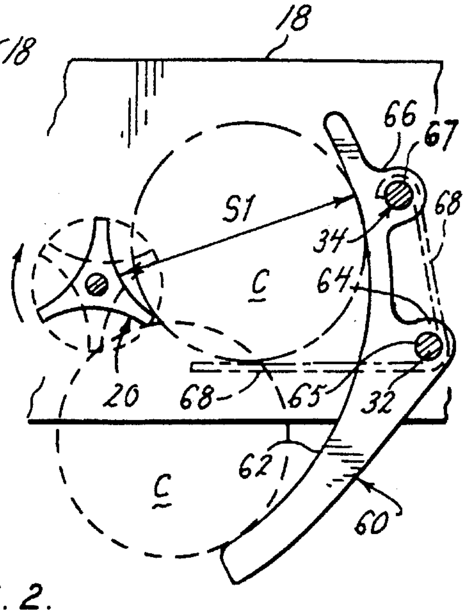
FIG. 2.
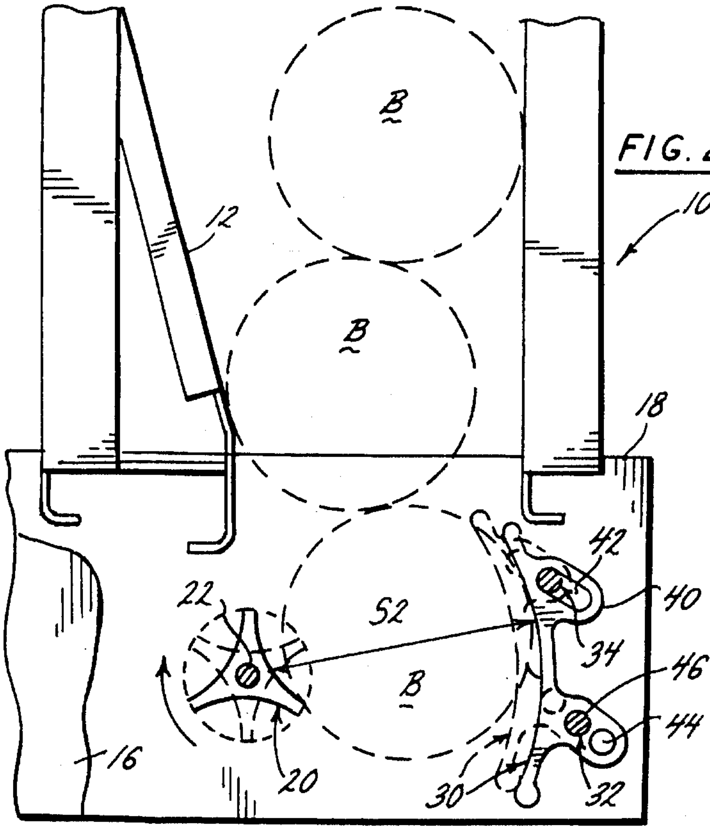
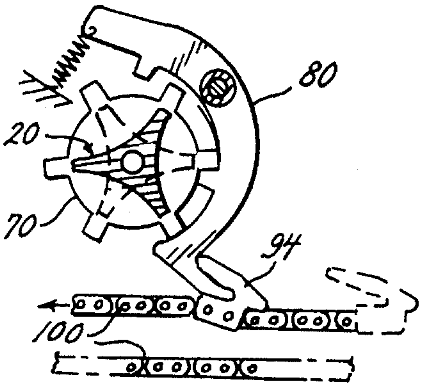
FIG. 7.

VENDING MACHINE DISPENSING SYSTEM

BACKGROUND OF THE INVENTION

This invention relates generally to vending machines and particularly to a dispensing system which provides for the dispensing of articles of different size from the same storage compartment.

Vending machines are well known which dispense articles, such as cans, from storage compartments. U.S. Pat. Nos. 4,991,739 and 4,991,740, for example, disclose vending machines for dispensing cans from compartments having a turnstile type support below each compartment which dispenses cans of a particular size, the compartments being suitable for storing a depth of one or more cans. The turnstile support is activated by a reciprocating release mechanism and works well for its intended purpose.

Beverage manufacturers increasingly are producing beverages in various sizes of containers in addition to the common 12 ounce (355 ml.) can. While it is not difficult to produce vending machines having compartments which dispense containers of a particular size, there is a need for a vending machine having compartments which can be converted readily from dispensing cans of one size to cans of another size, for example, from compartments dispensing 12 ounce (355 ml.) cans to those which will dispense cans or bottles of other sizes such as 20 ounce (592 ml.). The problem, of course, is that the larger volume containers have a greater diameter, or greater length or both, which cannot readily be dispensed from the same exit passage size.

Relatively complicated vending machines have been produced notably in Europe, for continuously dispensing containers of all one size or all of a different size. Unfortunately, complicated machines tend to be considerably more expensive than conventional machines.

This vending machine dispensing system solves these and other problems in a manner not revealed in the known prior art.

SUMMARY OF THE INVENTION

This invention provides a vending machine dispensing system which can be readily converted from continuously dispensing containers of one size to continuously dispensing containers of a different size.

This dispensing system has the particular advantage that the conversion can be readily made at the vending machine site since the conversion mechanism is self-contained and no additional parts are necessary nor is any shimming required.

The vending machine dispensing system can be used with systems dispensing containers from multiple depth compartments so that a system dispensing two small cans stored end-to-end can readily be converted to dispense a single larger bottle.

This vending machine dispensing system for dispensing articles of different diameter from a storage compartment comprises a storage compartment having an exit passage, a turnstile means on one side of the exit passage, and a stop means on the other side of the exit passage disposed in adjustable spaced relation from the turnstile means, to determine the diameter of the article passing between said turnstile and said stop means.

It is an aspect of this invention to provide that the storage compartment includes opposed end walls, the turnstile means is mounted for rotation about a fixed axis transverse to said end walls, and the stop means is disposed in spaced parallel relation to said fixed axis and includes means mounting said stop means in adjustable relation to said end walls to change said spaced parallel relation.

It is another aspect of this invention to provide that said stop means includes an arcuate member, and said mounting means includes an upper and lower elongate member extending between said end walls in parallel relation to said turnstile fixed axis, and upper and lower adjustment means on said stop means receiving said arcuate member in adjustable relation.

It is still another aspect of this invention to provide that said adjustment means includes an upper slot-shaped opening receiving said upper elongate member in sliding relation and a pair of lower openings, one of said lower openings receiving said lower elongate member in sliding relation to determine the relative position of the stop means.

It is yet another aspect of this invention to provide that said upper slot-shaped opening is inclined and said intersection axis of said pair of openings is inclined at substantially the same angle as said slot-shaped opening.

It is another aspect of this invention to provide that said lower elongate member is removable from said one lower opening and relocated in said other lower opening to change the spacing between said turnstile fixed axis and said arcuate stop member.

It is still another aspect of this invention to provide that one of said end walls includes movable latch means preventing inadvertent removal of said removable member and another aspect to provide that said latch means includes a pair of vertical slots disposed in one of said end walls adjacent an end of said removable elongate member and a U-shaped member mounted in said slots and movable from a position blocking said end of said removable member to a position clearing said end of said movable member.

It is an aspect of this invention to provide that the storage compartment includes first and second portions adapted to receive two articles of the same diameter in end-to-end relation.

It is another aspect of this invention to provide that the storage compartment includes opposed end walls and first and second compartment portions adapted to receive two articles of the same diameter in end-to-end relation, the turnstile means is mounted for rotation about a fixed axis transverse to said end walls, the stop means is disposed in spaced parallel relation to said fixed axis and includes means adjustably mounting said stop means in adjustable relation to said end walls to change said spaced parallel relation.

It is yet another aspect of this invention to provide that said first and second stop means are separated from each other by spacer means.

It is another aspect of this invention to provide that said first and second compartment portions are separated from each other by an interference means preventing one of said same diameter articles in one compartment portion moving longitudinally when there is no aligned can in the other compartment portion.

It is still another aspect of this invention to provide that said stop means includes an arcuate member, said mounting means includes an upper and lower elongate member extending between said end walls in parallel relation to said fixed axis and upper and lower adjustment means on said stop means receiving said arcuate member in adjustable relation, and said second stop means is mounted in fixed position on said upper and lower elongate members.

It is another aspect of this invention to provide that said second stop means includes an arcuate member and upper and lower openings receiving said upper and lower elongate members in sliding relation.

This vending machine dispensing system is inexpensive to manufacture and the conversion can be effectuated by an operator without special skills and the system is very effective for its intended purpose.

BRIEF DESCRIPTION OF THE DRAWINGS

FIG. 1 is an end elevational view, partly in cross section, showing the dispensing assembly arranged to dispense containers of one diameter and having one of the end plates removed for clarity;

FIG. 2 is a similar view to FIG. 1 showing the dispensing assembly arranged to dispense containers of a different diameter;

FIG. 6 is a cross sectional view taken on line 6—6 of FIG. 4;

FIG. 7 is a cross sectional view taken on line 7—7 of FIG. 4;

DESCRIPTION OF THE PREFERRED EMBODIMENTS

Figure 3:
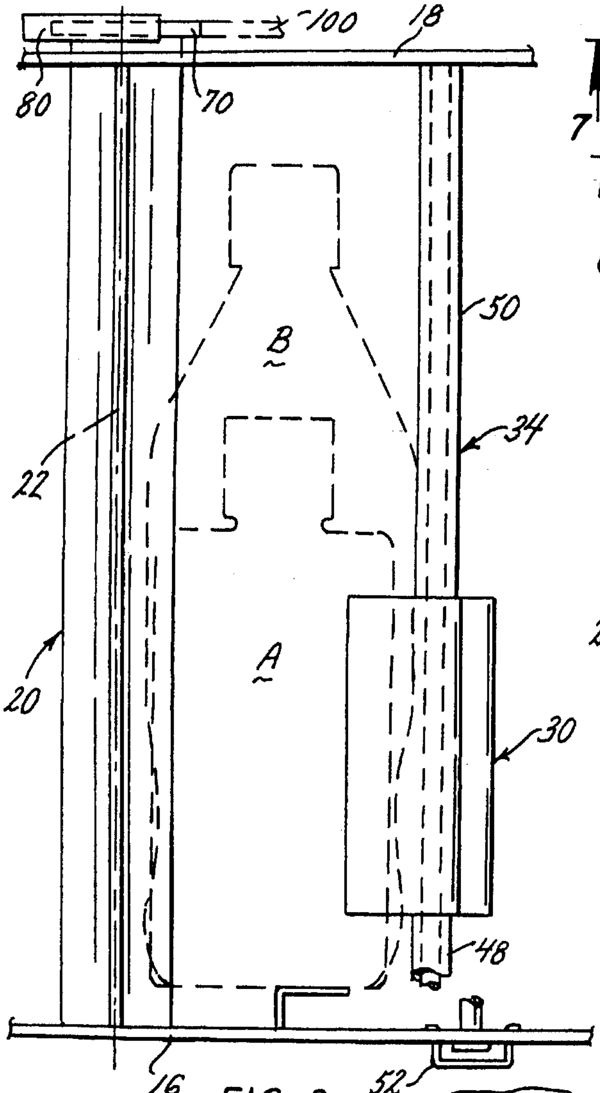
FIG. 3 is a plan view taken on line 3—3 of FIG. 1.
Figure 4:
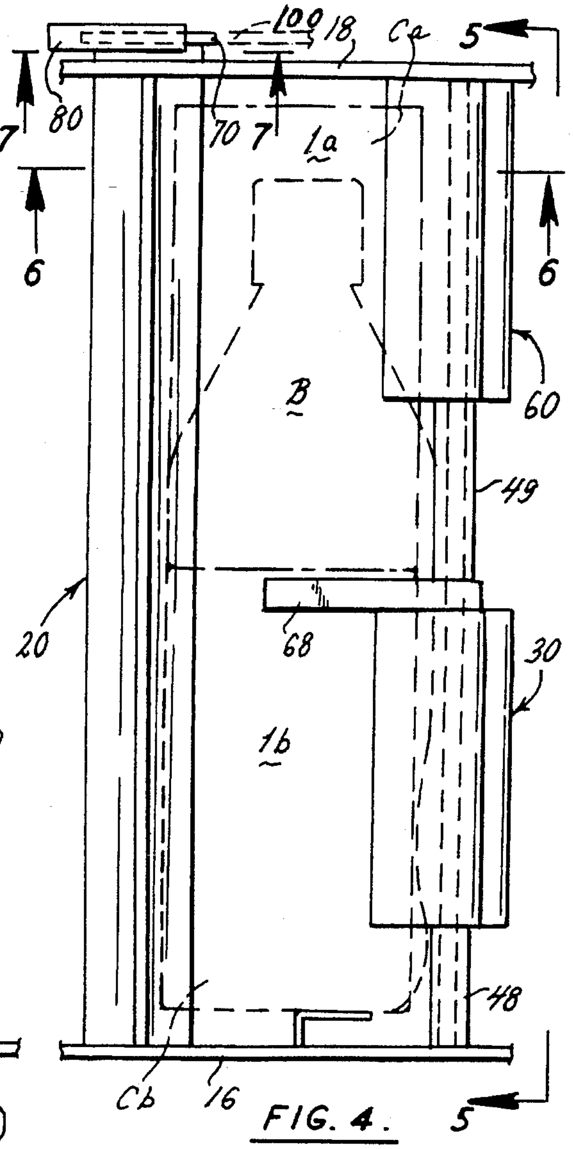
FIG. 4 is a similar view to FIG. 3 but showing a double can arrangement.

Referring now by reference numerals to the drawings and first to FIGS. 1, 3 and 4 it will be understood that the dispensing assembly 10 is suitable for a vending machine such as that described in U.S. Pat. No. 4,991,731, which is incorporated herein by reference. Similar to U.S. Pat. No. 4,991,731 the vending machine herein includes a plurality of compartments disposed in side-by-side relation each having a turnstile support means and stop means and a release means which may be a chain-operated ratchet and pawl assembly. However, for the purposes herein only one compartment indicated by numeral 1 will be described.

The compartment 1 includes opposed sidewalls 12 and 14 providing guide means for articles such as containers A which are, for example, 10 ounce bottles. The compartment is further defined by end walls 16 and 18 and, at the lower end of the compartment 1, a turnstile support member 20 and a stop member 30 are provided.

In the embodiment shown, the turnstile member 20 has a three-point star configuration and is supported between the compartment end walls 16 and 18 for rotation about a fixed axis 22. The stop member 30 is disposed in selectively spaced relation from the fixed axis of rotation 22. The spacing of the stop member from the turnstile member 20 is adjustable, and in the embodiment shown, the adjustment is achieved by the mounting arrangement of the stop member which consists essentially of lower and upper elongate members in the form of rods 32 and 34. The rods 32 and 34 have fixed axes disposed in spaced parallel relation from the fixed turnstile member axis 22. The stop member 30 is in the form of a molded body having an arcuate front face 36 and transverse ribs 38 and 40. In the embodiment shown, the arcuate front face 36 is disposed at a distance S1 from the arcuate face of the turnstile member 20. Further, and forming part of the adjustment means, upper rib 40 includes a slot-shaped opening 42 passing through the rib and receiving the rod 34 in sliding relation, and lower rib 38 includes a pair of circular openings 44 and 46. The lower rod 32 is shown in opening 44 but each opening is adapted to receive the lower rod 32 in sliding relation to adjust the position of the stop member. The inclination of the slot-shaped upper opening 42 and the inclination of intersection line between the axes of openings 44 and 46 is substantially the same and provides a structural arrangement by which the arcuate stop member 30 can be readily moved to a different distance S2 and provide a greater gap between turnstile member 20 and stop member 30 which will permit passage of a larger diameter container B.

This repositioning is achieved by removing the lower rod 34 and relocating the stop member 30, so that the upper rod 34 is located relatively at the other end of the slot-shaped opening 42, and then inserting the lower rod 32 in the other opening 46. The rearrangement is shown in FIG. 2 and, in effect, widens the exit passage to receive a container B, such as a 20 ounce bottle of a greater diameter.

It will be understood that with this structural arrangement of parts the fixed turnstile axis 22 and the axes of the lower and upper rods 32 and 34 are not changed. However, the location of the stop member 30 is changed without the need for additional parts, shimming, or the like. All that is necessary for repositioning the stop member 30 is built into the assembly.

Figure 8:
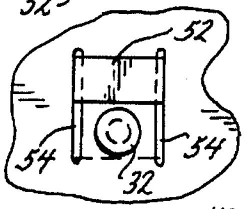
FIG. 8 is a fragmentary end elevational view taken on line 8—8 of FIG. 5.

As shown in FIG. 3, in order to ensure that the stop member 30 is maintained at the correct location longitudinally of the rods 32 and 34, the upper rod 34, which is not removed, is provided with spacers 48 and 50. As shown in FIG. 8, the lower rod 32, which is removed and replaced, is provided with a U-shaped latch member 52 which is snapped into place and is slidably mounted in cooperating slots 54. The latch member 52 can very easily be raised to clear the end of rod 32 to effectuate removal of the rod.

Figure 5:
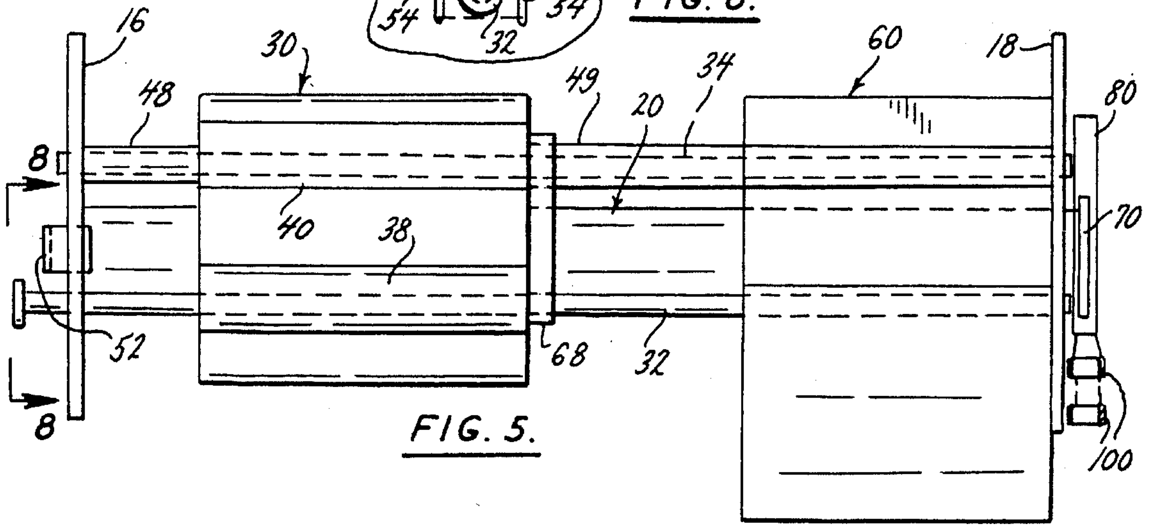
FIG. 5 is a side elevational view taken on line 5—5 of FIG. 4.
Figure 9:
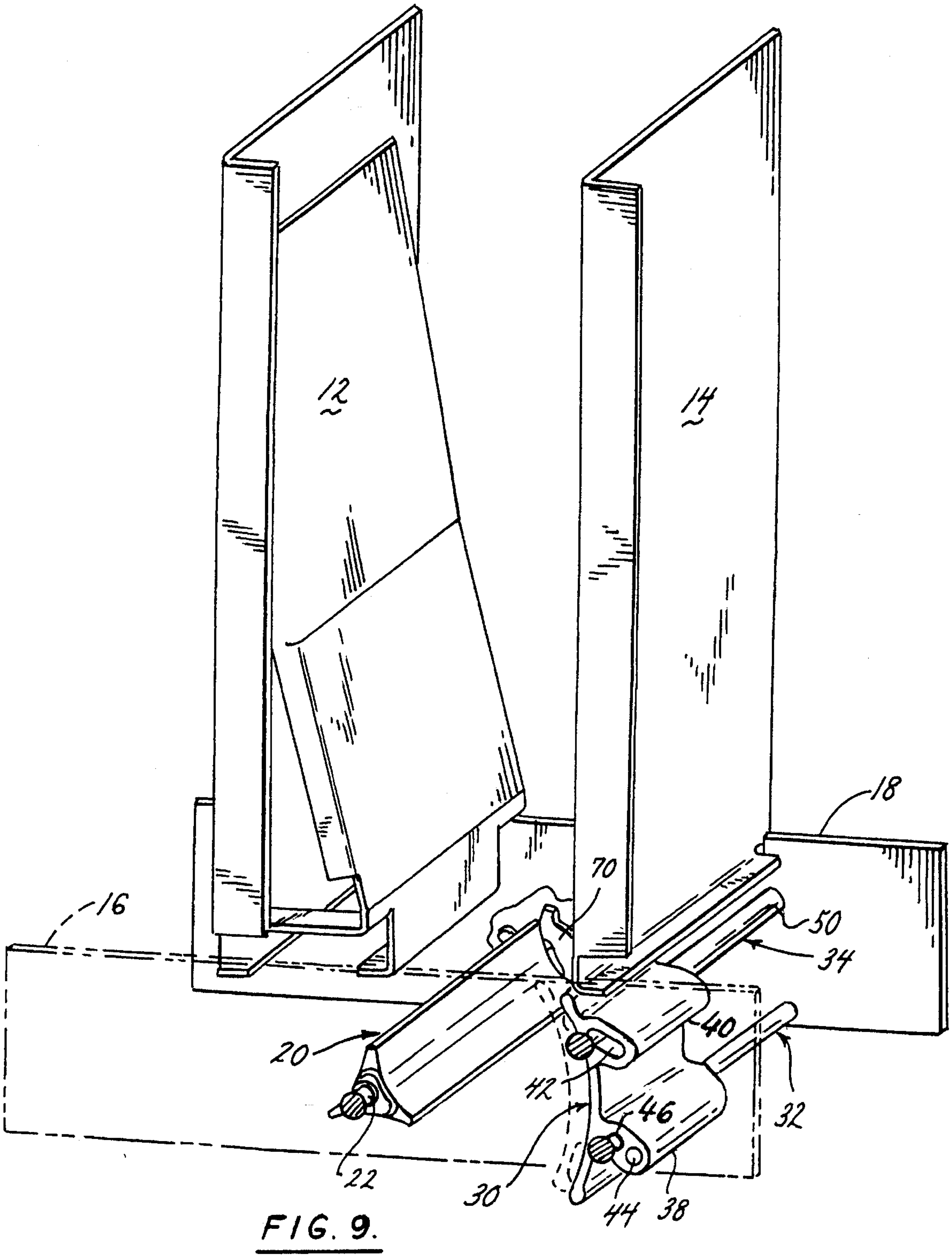
FIG. 9 is a simplified perspective view showing the general arrangement of parts.

A modified arrangement is shown in FIGS. 4, 5 and 6. FIG. 4 shows a compartment 1 divided into two portions 1*a* and 1*b* each receiving a container C, such as a 12 ounce can. The cans C are close to the same diameter as the container A but are of a sufficiently shorter length to permit two cans C to be placed end-to-end in the compartment 1. This arrangement requires the provision of a escrow member 60, which is best shown in FIG. 6 and is in the form of a molded body having an arcuate front face 62 and lower and upper transverse ribs 64 and 66. In the embodiment shown, the arcuate face is disposed at a distance S1 from the arcuate face of the turnstile member 20. The ribs 64 and 66 each includes a circular opening 68 and 70, respectively, slidably receiving the rods 32 and 34, respectively, so that the escrow member 60 is mounted in fixed relation on the rods relative to the turnstile member 20. As shown in FIGS. 4 and 5, a spacer 49 is provided on the upper rod 34 between the stop member and the escrow member 60, which maintains the stop member 30 and the escrow member 60 in position longitudinally. This arrangement provides that when the lower rod 32 is removed to change the disposition of the stop member 30, the disposition of the escrow member is unaffected. It will be understood that the escrow member 60 performs an escrow function only when the compartment is used for a double dispensing function. When a single, larger diameter and longer container B is being dispensed, or the same diameter shorter container A is being dispensed the escrow member 60 is clear of interference with such containers as shown in FIG. 4. The escrow function is described in greater detail in U.S. Pat. No. 4,991,739.

Also shown and described in greater detail in U.S. Pat. No. 4,991,739, is a release mechanism similar to that shown in FIG. 7. Briefly, the release mechanism consists of a ratchet and pawl assembly. The ratchet wheel 70 is fixedly connected to the end of the turnstile member 20, which tends to rotate under the weight of a container and the wheel 70 is held against rotation by a pivoted escapement pawl 80. The spring-biased pawl 80 is actuated as by an indexing member carried by reciprocating chain 100.

As shown in FIG. 4 an anti-tilt feature may be provided in the form of a leaf spring 68 which is mounted to the upper and lower rods 32 and 34 and extends into the area occupied by container Cb. The spring is normally depressed by the weight of the container Cb. However, when there is no container Cb in position the spring 94 prevents longitudinal movement of container Ca when the machine is tilted by vandals.

It is thought that the structure features and functional advantages of this dispenser assembly 10 have been fully understood from the foregoing description of parts. However, for completeness of disclosure the operation of the assembly will be briefly described.

The turnstile member 20 rotates about a rod having a fixed axis of rotation 22. The stop member 30 is carried by lower and upper rods 32 and 34, which have fixed axes disposed in spaced parallel relation from the fixed axis of rotation indicated by numeral 22 of the rod carrying the turnstile member 20. The inclined upper slot-shaped opening 42 receiving the rod 34, and the pair of openings 44 and 46 disposed in inclined relation to each other, provide that when the rod 32 is received within opening 44 the stop member 30 takes up a first position. In this first position, container A can pass between the turnstile member 20 and the stop member 30. When, however, the rod 32 is withdrawn from opening 44, and the stop member 30 relocated to the second position as shown in FIG. 3, so that the upper rod 34 is at the other end of the slot-shaped opening 42, the lower rod 32 can be inserted into the other opening 46. The result of this relocation to a second position of the stop member 30 is that a wider gap is created such that container B can pass between the turnstile member 20 and stop member 30.

It will be understood that there is a degree of gap tolerance in that a specific gap will permit the passage of containers within a certain range, for example, several 16 ounce and 20 ounce bottles are close to the same diameter.

Also, although an adjustment arrangement of the stop member 30 has been shown in which the stop member 30 is adjustable relative to the rods 32 and 34 an arrangement could be used in which the rods 32 and 34 were fixed relative to the stop member 30 and upper and lower adjustment openings could be provided in the vending machine end walls 16 and 18 in which the rods were adjustable.

Although the invention has been described by making detailed reference to the preferred embodiments, such detail is to be understood in an instructive rather than in any restrictive sense, many other variants being possible within the scope of the claims hereunto appended.

We claim as our invention:

1. A vending machine dispensing system for dispensing articles of different diameter from a storage compartment, the system comprising:

(a) a storage compartment having an exit passage, (b) a turnstile means on one side of the exit passage, and (c) a stop means on the other side of the exit passage and means for adjusting the spacing between the stop means and the turnstile means, to determine the diameter of the article passing between said turnstile means and said stop means.

2. A vending machine dispensing system as defined in claim 1, in which:

(d) the storage compartment includes first and second portions adapted to receive two articles of the same diameter in end-to-end relation, and (e) a second stop means is disposed on the other side of the exit passage in spaced end-to-end relation from said first stop means and in fixed spaced relation from the turnstile means to provide an escrow means for one of said same diameter articles.

3. A vending machine dispensing system as defined in claim 1, in which:

(d) the storage compartment includes opposed end walls and first and second compartment portions adapted to receive two articles of the same diameter in end-to-end relation, (e) the turnstile means is mounted for rotation about a fixed axis transverse to said end walls, (f) the stop means is disposed in spaced parallel relation to said fixed axis and includes means adjustably mounting said stop means in adjustable relation to said end walls to change said spaced parallel relation, and (g) a second stop means is disposed on the other side of the exit passage in spaced end relation from said spaced stop means and in fixed spaced relation from the turnstile means to provide and escrow means for one of said same diameter articles.

4. A vending machine dispensing system as defined in claim 3, in which:

(h) said first and second stop means are separated from each other by spacer means.

5. A vending machine dispensing system as defined in claim 3, in which:

(i) said first and second compartment portions are separated from each other by an interference means preventing one of said same diameter articles in one compartment portion moving longitudinally when there is no aligned can in the other compartment portion.

6. A vending machine dispensing system as defined in claim 3, in which:

(i) said stop means includes an arcuate member, (j) said mounting means includes an upper and lower elongate member extending between said end walls in parallel relation to said fixed axis and upper and lower adjustment means on said stop means receiving said arcuate member in adjustable relation, and (k) said second stop means is mounted in fixed position on said upper and lower elongate members.

7. A vending machine dispensing system as defined in claim 6, in which:

(k) said second stop means includes an arcuate member and upper and lower openings receiving said upper and lower elongate members in sliding relation.

8. A vending machine dispensing system for dispensing articles of different diameter from a storage compartment, the system comprising:

(a) a storage compartment having an exit passage, (b) a turnstile means on one side of the exit passage, and (c) a stop means on the other side of the exit passage disposed in adjustable spaced relation from the turnstile means, to determine the diameter of the article passing between said turnstile and said stop means, (d) the storage compartment including opposed end walls, (e) the turnstile means being mounted for rotation about a fixed axis transverse to said end walls, and (f) the stop means being disposed in spaced parallel relation to said fixed axis and including means mounting said stop means in adjustable relation to said end walls to change said spaced parallel relation.

9. A vending machine dispensing system as defined in claim 8, in which:

(g) said stop means includes an arcuate member, and (h) said mounting means includes an upper and lower elongate member extending between said end walls in parallel relation to said turnstile fixed axis, and upper and lower adjustment means on said stop means receiving said arcuate member in adjustable relation.

10. A vending machine dispensing system as defined in claim 9, in which:

(i) said adjustment means includes an upper slot-shaped opening receiving said upper elongate member in sliding relation and a pair of lower openings, one of said lower openings receiving said lower elongate member in sliding relation, to determine the relative position of the stop means.

11. A vending machine dispensing system as defined in claim 10, in which:

(j) said upper slot-shaped opening is inclined and said intersection axis of said pair of openings is inclined at substantially the same angle as said slot-shaped opening.

12. A vending machine dispensing system as defined in claim 10, in which:

said lower elongate member is removable from said one lower opening and relocated in said other lower opening to change the spacing between said turnstile fixed axis and said arcuate stop member.

13. A vending machine dispensing system as defined in claim 12, in which:

(k) one of said end walls includes movable latch means preventing inadvertent removal of said removable member.

14. A vending machine dispensing system as defined in claim 13, in which:

(l) said latch means includes a pair of vertical slots disposed in one of said end walls adjacent an end of said removable elongate member and a U-shaped member mounted in said slots and movable from a position blocking said end of said removable member to a position clearing said end of said movable member.

15. A vending machine dispensing system for dispensing articles of different diameter from a storage compartment, the system comprising:

(a) a storage compartment having an exit passage, (b) a turnstile means on one side of the exit passage having an axis of rotation, and (c) a stop means disposed in spaced parallel relation to said axis of rotation and means for adjusting the spaced parallel relation from one position to permit passing of one diameter of article between said turnstile and said stop means to another position to permit passing of an article of a different diameter between said turnstile means and said stop means.

16. A vending machine dispensing system as defined in claim 15, in which:

(d) the axis of rotation of the turnstile is fixed relative to the storage compartment.

* * * * *